United States Patent Office 3,507,631
Patented Apr. 21, 1970

3,507,631
NITRIDE-REFRACTORY METAL CUTTING TOOLS
Paul C. Yates, Wilmington, Del., assignor to E. I. du Pont de Nemours and Company, Wilmington, Del., a corporation of Delaware
No Drawing. Continuation-in-part of application Ser. No. 580,848, Aug. 29, 1966. This application July 17, 1968, Ser. No. 745,380
Int. Cl. B22f 3/00, 5/00, 7/00; C22c 29/00, 31/04
U.S. Cl. 29—182.7          8 Claims

ABSTRACT OF THE DISCLOSURE

Cutting tools comprising a dense interdispersion of from 1.5 to 19 parts by volume of a nitride of aluminum, titanium, zirconium, tantalum, hafnium, niobium, vanadium or their mixtures, bonded with one part by volume of molybdenum, tungsten, rhenium and their alloys, and optionally containing substantial amounts of other chemically stable refractory nitrides, oxides, silicates, aluminates, chromites or carbides, such as alumina and titanium carbide, wherein the thermal coefficients of expansion of the various component phases differ by less than a factor of 2, are highly resistant to heat cracking and thus are very effective for use in interrupted cutting of metal.

CROSS-REFERENCE TO RELATED APPLICATIONS

This application is a continuation-in-part of my copending application Ser. No. 580,848, filed Aug. 29, 1966, which in turn is a continuation-in-part of my then copending application Ser. No. 457,467, filed May 20, 1965, now abandoned, which in turn was a continuation-in-part of my then copending application Ser. Nos. 371,776 and 371,779, filed June 1, 1964, now abandoned.

BACKGROUND OF THE INVENTION

This invention is related to cutting tool compositions and more particularly is directed to cutting tools comprising an interdispersion of a nitride of aluminum, titanium, zirconium, tantalum, hafnium, niobium, vanadium, or their mixtures bonded with molybdenum, tungsten, rhenium or their alloys in which the thermal coefficient of expansion of the metal binder differs by a factor of less than 2 from the thermal coefficient of expansion of the nitride present, and to the use of these tools in high-speed, interrupted cutting of metals.

Small amounts of refractory metal nitrides such as boron nitride have been incorporated in tunsten in the past to improve its filamentary properties, see Laise, U.S. Patent No. 1,631,493, and the essential nitrides of this invention have been used with refractory metals to improve the properties of electrical contacts, see Hensel, U.S. Patent No. 2,180,984. Similarly, small amounts of nitrides such as titanium nitride have been used to improve the high temperature properties of molybdenum and tungsten as disclosed in Dickinson et al., U.S. Patent No. 3,161,949. Small amounts of these nitrides have also been present in the form of carbonitrides in cutting tools such as those described in Walter, U.S. Patent No. 1,961,468 and U.S. Patent No. 2,018,752. However, none of these compositions contained nitrides as the principal component and none of them possesed the similarity of coefficients of expansion between the binder phase and refractory phase, which is characteristic of the compositions of this invention. As a result, nothing in the prior art suggests that the compositions of this invention would be especially effective as cutting tools with the surprising resistance to heat cracking found in the cutting tools of this invention.

I have discovered that the cutting tools of this invention are surprisingly resistant to mechanical disintegration when subjected to alternate cycles of heating and cooling as is encountered in interrupted cutting of alloys with high shear strength. As a result, the cutting tools of this invention are particularly well-suited for use in such interrupted cutting, giving less down-time, improved performance, and reduced tool consumption.

SUMMARY OF THE INVENTION

In summary, this invention is directed to tools for cutting metal comprising a dense interdispersion of from 1.5 to 19 parts by volume of an essential nitride of aluminum, titanium, zirconium, tantalum, hafnium, niobium, vanadium or their mixtures, bonded with one part by volume of molybdenum, tungsten, rhenium or their alloys, and optionally containing as a replacement for the essential nitride a refractory compound selected from among the chemically stable refractory nitrides, silicates, aluminates, chromites, carbides and oxides. The dense interdispersion is characterized in that the thermal coefficient of expansion of the metal binder differs by a factor of less than 2 from the thermal coefficients of expansion of the essential nitrides and other refractory components which are present. This invention is also directed to the use of these cutting tools in making interrupted cuts on metals having high shear strength.

The cutting tools of this invention are exceptionally resistant to thermal cracking resulting from rapid fluctuation in the temperature of a cutting tip during use and as a result are very useful in milling, cutting, turning, or otherwise working very hard or very tough metals, especially when the cutting is interrupted in cycles.

DESCRIPTION OF THE INVENTION

The cutting tools of this invention comprise an interdispersion of a nitride of aluminum, titanium, zirconium, tantalum, hafnium, niobium, vanadium or their mixtures, bonded with molybdenum, tungsten, rhenium or their alloys.

The term "interdispersion" as used herein describes a relationship of the constituents and is meant to include traditional dispersions in which there is a dispersed particulate phase and a dispersant continuous phase. It is also meant to include those mixtures in which there are two or more phases and some or all of them are continuous and interpenetrating as well as simple mixtures in which the phases are particulate or interrupted and homogeneously intermixed.

The terms "cutting tools," "tips," and "bits" as used herein are intended to include those shaped bodies employed in metal removal and are referred to hereinafter generically as cutting tools.

The dense homogeneous interdispersions which comprise the cutting tools of this invention can be prepared by the methods described in my copending application Ser. No. 580,848, filed Aug. 29, 1966. The required precautions in fabricating these interdispersions as well as requisite conditions of purity and methods for preparing the constituents are fully exemplified in that copending application.

Essential nitrides

The essential nitrides of the cutting tools of this invention are those chemically stable refractory nitrides of Groups III, IV–B, and V–B of the Periodic Table, having free energies of formation greater than 30 kilocalories per gram atom of nitrogen at 298° Kelvin, and melting points, sublimation points or decomposition points in excess of 2000° C.

These nitrides which include the nitrides of aluminum, titanium, hafnium, zirconium, vanadium, niobium, tantalum and their mixtures, are present in the interdispersions comprising the cutting tools of this invention in amounts ranging from 1.5 to 19 parts by volume per part by volume of metal binder. While cutting tools can be made comprising interdispersions containing amounts of essential nitride of less than 1.5 parts by volume per part by volume of binder metal, they do not display as desirable a combination of hardness, wear-resistance and chemical resistance as cutting tools comprising interdispersions containing 1.5 or more parts of nitride per part of binder metal. Similarly, the amounts of nitride can exceed 19 parts by volume ranging up to almost 100 parts by volume without entirely losing their efficacy. However, by restricting the amount of essential nitride to 19 parts or less per part om metal binder, the probability of continuity of the metal binder phase is greatly increased which greatly increases the probability of outstanding impact strength and toughness in subsequent cutting tools.

Metal binders

The metal binders which are used in the interdispersions comprising the cutting tools of this invention are molybdenum, tungsten, rhenium and their alloys.

These binder metals are used in an amount which will result in the relationship described above for the essential nitrides. Thus the binder metals are used in amounts which yield one part of metal per 1.5 to 19 parts by volume of essential nitride.

The binder metals can contain, in addition to the three metals mentioned above and their mixtures with each other, those alloying agents conventionally used with molybdenum, tungsten, and rhenium. Representative of suitable alloying agents are chromium, aluminum, titanium, zirconium, hafnium, vanadium, niobium, tantalum, manganese, iron, cobalt, and nickel. Small amounts of the iron group metals, such as nickel or cobalt in particular, are often used to advantage as sintering aids in preparing the dense interdispersions comprising the cutting tools of this invention.

Refractory additives

As was mentioned above, chemically stable refractory compounds can be used to partially replace the essential nitrides in the dense interdispersions comprising the cutting tools of this invention. Representative of suitable refractory compounds are refractory, chemically stable nitrides such as the nitrides of uranium, boron, beryllium, cerium, thorium, and the rare earth metals; refractory, chemically stable carbides such as the carbides of titanium, zirconium, tantalum, and niobium; chemically stable, refractory silicates, aluminates and chromites, such as the silicates, aluminates and chromites of zirconium, magnesium, calcium, barium and strontium; chemically stable, refractory oxides such as the oxides of magnesium, zirconium, aluminum, thorium, hafnium, titanium, chromium, beryllium, zinc, calcium, barium, strontium, silicon, cerium, and the rare earth metals; as well as mixtures of these.

These refractory additives can be used to replace up to 50 percent by volume of the essential nitrides and in some instances up to 80 percent by volume of the essential nitride.

It is important that the essential nitrides constitute at least 20 percent of the non-metallic components so that the possibility of a continuous phase of essential nitride is enhanced. The preference for at least 50 volume percent of essential nitrides in the non-metallic phase of the dense interdispersions comprising the cutting tools of this invention is based on the improved performance of such tools.

When refractory additives are used to replace from 50 to 80 volume percent of the essential nitrides, it is much preferred to use alumina or titanium carbide as the refractory additives. These two additives are also preferred for use when less than 50 percent of the essential nitrides are replaced.

Preparation of cutting tools

The dense interdispersions of essential nitrides, binder metal, and refractory additives if used, can be fabricated into cutting tools by methods obvious to those skilled in the art.

Most simply the interdispersion can be cut such as with a diamond saw and shaped and polished to produce a cutting edge. The dense interdispersion can be affixed to a metal shank if desired, such as by brazing, either before or after it is shaped to a cutting edge.

Utility

The cutting tools comprising the dense interdispersions of this invention are useful in cutting, shaping, or other metal removal processes involving as the work piece a metal selected from among iron, cobalt, nickel, copper, titanium, molybdenum, tungsten, tantalum and niobium, alloys of these with one another, and their alloys with compounds selected from among carbon, boron, aluminum, chromium, silicon, titanium and maganese.

The cutting tools of this invention are characterized by their resistance to mechanical disintegration when subjected to alternate cycles of heating and cooling encountered in interrupted cutting of metals with high shear strength. In such cuts the cutting edge of a tool is alternately heated to very high temperatures, up to 800° C. and perhaps 1000° C., and then is air-cooled as it emerges from the work piece, probably to 300 or 400° C., only to be reheated again as it reenters the work piece. Examples of such interrupted cuts are face milling or side cutting with an end mill where during half the rotation of the tool a cutting edge is out of the work material and is being air-cooled. Other examples of interrupted cutting include turning on a lathe the diameter of a work piece containing grooves, and in tools on chuckers and automatic screw machines where relatively short cuts are made in a repeated cycle.

The effect of this thermal cycling is readily observed in conventional cutting tools. Ordinarily, sharp lines or cracks, regularly spaced, appear along the flank and in the wear crater of the tool at right angles to the cutting edge. These cracks are propagated as wear progresses on the tool until the cutting edge deteriorates due to the cracks.

It is believed that the outstanding resistance to thermal cracking demonstrated by the cutting tools of this invention is largely due to maintaining a minimum of difference between the thermal coefficients of expansion of the component phases, thus minimizing internal strain due to thermal expansion. The thermal coefficient of expansion of the metal binder phase of the dense interdispersions comprising the cutting tools of this invention differs by a factor of less than 2 from the thermal coefficients of expansion of the essential nitride or other refractory components present. Preferably this difference in thermal coefficients of expansion between the component phases is less than a factor of 1.5.

Of the many possible combinations of components in the dense interdispersions comprising the cutting tools of this invention, it is preferred that the essential nitride used be either aluminum nitride, titanium nitride, or their mixture; the preferred refractory additives are alumina, titanium carbide and their mixture; the preferred metal binders are tungsten and molybdenum, often containing as much as 15 or 20 volume percent of an iron group metal such as nickel or cobalt. Particularly effective combinations of the preferred constituents include dense interdispersions containing 35 to 70 volume percent titanium nitride, 1 to 10 volume percent aluminum nitride, 5 to 20 volume percent alumina and 20 to 35 volume percent tungsten; those containing 40 to 60 volume percent titanium nitride, 20 to 40 volume percent aluminum nitride, and 10 to 25 volume percent of a metal binder of which 1 to 5 volume percent can be nickel, the balance tungsten; as well as those containing 35 to 70 volume percent titanium nitride, 10 to 30 volume percent alumina and 15 to 35 volume percent of tungsten or tungsten alloy.

As mentioned previously, the preparation and characterization of the dense interdispersions comprising the cutting tools of this invention is described in my copending application Ser. No. 580,848, filed Aug. 29, 1966, the entire disclosure of which is hereby expressly incorporated by reference.

This invention is further illustrated in the following illustrative examples wherein parts and percentages are by weight unless otherwise noted.

EXAMPLE 1

Ninety-four grams of ballmilled 250 millimicron size particles of titanium hydride are loaded in alumina boats and placed in an alumina tube furnace. The air is displaced from the furnace by purging for 30 minutes with pure nitrogen, after which the atmosphere in the furnace is replaced with ammonia, which is maintained throughout the subsequent treatment. The temperature of the furnace is increased at the rate of 250° an hour, to a temperature of 1000° C. and the furnace is held at this temperature for 3 hours. The temperature is then raised to 1100° C. and is maintained for 16 hours, following which it is raised to 1200° C. and this temperature is held for 6½ hours. The furnace is cooled to room temperature, and a total of 114 g. of product are recovered in the form of a finely divided powder. This represents 97.8% of the theoretical yield expected from a reaction to form titanium nitride. Chemical analysis shows the product to contain 17.91% nitrogen, 0.47% oxygen, with the balance of the composition being titanium. The nitrogen surface area of this powder is 0.3 m.$^2$/g. and examination by X-ray line broadening shows it to consist of titanium nitride of an average crystallite size of 84 millimicrons. No other phases are present.

Forty and two-tenths grams of this material are loaded into a 1.1 liter rubber lined steel ballmill with 47.7 g. of finely divided tungsten metal having a particle size of about 100 millimicrons, and 2500 g. of tungsten carbide-6% cobalt inserts. The tungsten carbide-cobalt inserts are about ¼″ in diameter and ¼″ long in the form of small cylinders. Also loaded into the mill is 350 cc. of a high boiling hydrocarbon oil having a flash point of 185° F. This mill is rotated on rubber-lined rollers for a period of 24 hours at a speed of 60 r.p.m.

The resulting finely divided powder of interdispersed titanium nitride and tungsten metal is recovered from the mill and separated from the tungsten carbide-cobalt rod inserts, removed from the majority of the oil by decantation, and washed completely free of oil by six washes with hexane. It is then dried in a vacuum oven. Chemical analysis shows the powder to consist of about 3 parts by volume titanium nitride, and about 0.05 part by volume tungsten carbide per part by volume of a metal which is 99.6 volume percent tungsten and 0.4 volume percent cobalt. The tungsten carbide and cobalt are picked up by attrition of the rod inserts during the grinding process.

Thirty-two grams of this powder is placed in a cylindrical carbon mold which is inserted into a hot press, the temperature of the furnace is raised to 1000° C., and a pressure of 4000 p.s.i. imposed. The temperature of the furnace is then increased, while maintaining this pressure, to a final temperature of 2000° C. and held for a period of 5 minutes. The sample is then removed from the furnace. The resulting refractory interdispersion of the invention is cut with a diamond saw into specimens for testing transverse rupture strength, impact strength, hardness on the Rockwell A scale, and density. A section is also machined into the form of a metal cutting tool insert. The transverse rupture strength is 83,000 p.s.i., its impact strength 9.9 ft. lbs./in.$^2$, and its Rockwell A hardness 88.3. The density is 8.79 g./cc., with is 98% of the 8.97 g./cc. density to be expected for this composition.

Metallographic examination of the refractory shows an interdispersion of titanium nitride and tungsten carbide with a tungsten-cobalt alloy. The average particle size of the alloy crystals ranges from .4 to .8 micron and the average particle size of the titanium nitride is about .5 micron.

The metallographic examination of the interdispersion also shows that both the tungsten-cobalt alloy and the titanium nitride are present within a square region 10 microns on edge, and of ten such 100 square micron regions examined, nine exhibit these same structural characteristics.

The electrical resistivity of the dispersion is about 0.01 milliohm centimeters. This low value of electrical resistivity indicates that the continuity of the metal in this refractory interdispersion is not interrupted by titanium nitride.

A cutting tool insert of this composition is tested on 4340 steel, using a depth of 1/16″ and varying the surface speed at which cutting is performed. At a speed of 500 surface feet per minute, after 3 minutes of cutting, the flank wear is 6 mils, the depth of the crater formed is ¼ of 1 mil, and the crater width is 22 mils. At a surface speed of 1000 feet per minute, after testing for 1 minute, the flank wear is 5 mils, the depth of crater is ½ of 1 mil, and the crater width is 26 mils. Even at a surface speed of 1500 feet per minute, the flank wear after 1 minute of cutting ranges between 6 and 15 mils for several different faces of this tool insert, while the crater width is 16 mils, and the depth of the crater is 2 mils. No thermal cracking lines developed on the tool.

EXAMPLE 2

One and one-half pounds of tungsten metal powder are placed in a 1 gallon steel ballmill filled with 5/16″ steel balls to 40% of its volume. This is covered with 1700 cc. of a high boiling hydrocarbon having a flash point of 170° C., and milled for a period of 3 days at a speed of 60 r.p.m. The tungsten metal powder is separated by sedimentation and centrifugation from the oil, and washed two times with hexane, then with acetone, and finally with water. It is treated with a mixture of 1 liter of concentrated hydrochloric acid and 1.5 liters of distilled water, and heated for one hour at 90° C. This is done to dissolve iron picked up during the milling operation. It is allowed to remain stirring with the hydrochloric acid-water mixture overnight. It is then centrifuged to recover the tungsten and to separate this from the dissolved iron which has been removed by acid treatment, and is washed with a 0.1 normal HCl solution until free of iron. This requires five washes. It is then further washed with distilled water until free of chloride ion, and dried in a vacuum oven. The tungsten powder so obtained has a nitrogen surface area of 3.0 m.$^2$/g., corresponding to an individual particle size of about 100 millimicrons. Chemical analysis shows it to consist of 98.91% tungsten metal, 0.6% iron, and 0.66% oxygen.

Thirty and four tenths grams of the titanium nitride of Example 1, 58.6 grams of the tungsten metal powder prepared above, and 7.8 grams of a —10 micron sized aluminum nitride powder are milled using tungsten rod inserts, 350 cc. of a high boiling hydrocarbon oil as a dispersion medium, a milling time of 48 hours, and a speed of 60 r.p.m. Recovery is effected as previously described, and 36 grams of this composition are pressed at a temperature of 2200° C., under a pressure of 4000 p.s.i., with a holding time of 10 minutes. The resulting refractory interdispersion contains 2.8 parts by volume of titanium nitride and 1.2 parts by volume of aluminum nitride per part by volume of tungsten metal.

The transverse rupture strength of this refractory is 96,000 p.s.i., its impact strength is 7.5 ft./lbs./in.$^2$, its hardness is 90.5 on the Rockwell A scale, and its density is 9.68 g./cc., which is 100% of the theoretical density to be expected of this composition.

This material is exceptional for use as a cutting tool because of its combined physical properties and a good resistance to thermal shock.

EXAMPLE 3

One thousand three hundred and sixty grams of —325 mesh molybdenum metal powder is placed in a 1 gallon steel ballmill filled to 40% of its volume with steel balls and also containing 1800 cc. of Phillips Petroleum Co.'s "Soltrol 170" a complex mixture of saturated branch-chain hydrocarbons having a flash point of 85° C. and a boiling range of 215–246° C. This is milled at a speed of 60 r.p.m. for 3 days, after which the molybdenum powder is separated from the hydrocarbon oil and the steel balls, washed thoroughly with hexane to remove the oil, and dried in a vacuum oven. It is purified with a hydrochloric acid-water treatment in a manner identical to that described for the purification of the tungsten metal powder of Example 2. The resulting, finely divided, molybdenum metal powder has an average particle size of from 100 to 200 millimicrons, and contains only traces of iron as an impurity.

Fifty-three and seven tenths grams of the titanium nitride of Example 1 and 10.2 g. of the molybdenum metal powder prepared above are milled as described in the previous example. Recovery from the mill, purification, drying and hot pressing are also as described in the previous example.

The resulting refractory consists of an interdispersion of 11 parts by volume of titanium nitride with 1 part by volume of molybdenum metal. As in the previous example, this refractory is an excellent cutting tool, especially for high speed light cuts on steels and cast iron.

EXAMPLE 4

Forty grams of a finely divided form of gamma alumina, having a surface area of about 200 m.$^2$/g., and consisting of relatively non-aggregated spheres, are mixed with 400 grams of an aluminum flake pigment having an oxygen content of 1.43%. To this mixture is added 5.5 grams of a dispersion of lithium metal in paraffin wax, the content of lithium metal being approximately 37%. These are loaded into a one gallon steel mill which is filled to 40% by volume with steel balls. Then an isoparaffinic hydrocarbon solvent having a flash point of 185° F. is added to the mill in an amount sufficient to cover the steel balls. The loading of steel balls is 9288 grams and 1700 cc. of the high boiling hydrocarbon oil are used. The mill is closed and rotated on rollers running at a speed of 60 r.p.m.'s for a period of four days. A sample of about 150 grams of this material is separated from the steel balls and the hydrocarbon solvent and loaded into a carbon boat and placed in an alumina tube, which, in turn, is placed in an electric furnace. The temperature is raised to 1450° C. while maintaining an atmosphere of cracked ammonia and N$_2$ in the tube over a period of about 3 hours, and held at that temperature for 2 hours.

The product at this stage consists of a very finely divided powder, primarily aluminum nitride, having a surface area of 6.6 m.$^2$/g. and a crystallite size by X-ray line broadening of 210 m$\mu$.

After determination of the surface area, this material is placed back into the carbon boat and fired for an additional 8 hours under a nitrogen atmosphere at 1450° C. A chemical analysis shows it to contain 65% aluminum, 2.43% oxygen, and 30.72% nitrogen. Its surface area is 2.0 m.$^2$/g. X-ray line broadening measurements show this material to consist of aluminum nitride having a crystallite size of approximately 265 millimicrons.

Twenty grams of this aluminum nitride is mixed in a high speed mixer, suspended in 200 cc. of the same high boiling hydrocarbon solvent as is used in the milling operation, with 4 grams of —325 mesh molybdenum metal power. The mixture of aluminum nitride and molybdenum metal is separated from the solvent by sedimentation, washed four times with hexane, and dried overnight in a vacuum oven.

Ten grams of this powder, which consists of about 17.4 parts by volume aluminum nitride per part by volume molybdenum, is pressed in a hot press using 1″ diameter carbon molds. At a temperature of 1600° C. a pressure of 200 p.s.i. is applied to the sample, then the temperature is increased to 1900° C., whereupon the pressure is increased to 4000 p.s.i., the temperature is again increased to 2000° C., and the sample is held at this temperature for 5 minutes. The mold is then cooled and the sample removed.

Metallographic examination of the product shows an interdispersion of molybdenum metal ranging in particle size from 1 to 5 microns, with a four micro average particle size aluminum nitride phase. The molybdenum metal is put in in the form of approximately 40 micron size crystals originally, and the milling operation is not extensive. The electrical resistivity of the dispersion is $3.07 \times 10^5$ ohms/cm. This very high value of electrical resistivity shows that the continuity of molybdenum in this dispersion is interrupted by aluminum nitride. In spite of this, it is to be noted that the performance of this interdispersion as a cutting tool on steel is quite outstanding.

The molded product is cut into small transverse rupture samples, bars for testing the impact strength, and a section for evaluation of cutting tips for cutting steel. The density of the interdispersion is determined to be 3.53 g./cc., its impact strength is 5.1 ft. lbs./in.$^2$, its hardness 89.2 on the Rockwell A scale, and the average transverse rupture strength of two bars tested is 48,150 p.s.i.

The interdispersion is tested as a cutting tool for steel on 4340 grade steel at feed rates of 340, 500, 1000, and 1500 surface feet per minute. The depth of cut is 1⁄16″. The interdispersion performs very satisfactorily, showing a flank wear at 340 surface feet per minute of only 5 mils after 3 minutes of cutting, 9 mils at 500 surface feet per minute after 3 minutes of cutting, and a flank wear of 8 mils after one minute of cutting at 1000 surface feet per minute. No thermal cracking developed on the tool during these tests.

EXAMPLE 5

One and one-half pounds of tungsten metal powder are placed in a 1 gallon steel ball mill filled with 3⁄16″ steel balls to 40% of its volume. This is covered with 1700 cc. of a high boiling hydrocarbon having a flash point of 185° F., and milled for a period of 3 days at a speed of 60 r.p.m. The tungsten metal powder is separated by sedimentation and centrifugation from the oil, and washed two times with hexane, then with acetone, and finally with water. It is treated with a mixture of 1 liter of concentrated hydrochloric acid and 1.5 liters of distilled water, and heated for one hour at 90° C. This is done to dissolve iron picked up during the milling operation. It is allowed to remain stirring with the hydrochloric acid-water mixture overnight. It is then centrifuged to recover the tungsten and to separate this from the dissolved iron which has been removed by acid treatment, and is washed with a 0.1 normal HCl solution until free of iron. This requires five washes. It is then further washed with distilled water until free of chloride ion, and dried in a vacuum oven. The tungsten powder so obtained has a nitrogen surface area of 3.0 m.$^2$/g., corresponding to an individual particle size of about 100 millimicrons. Chemical analysis shows it to consist of about 98.9% tungsten metal, 0.6% iron, and 0.7% oxygen.

Sixty-six grams of this tungsten powder is ballmilled in a rubber-lined mill with 34 grams of the aluminum nitride prepared as described in Example 17. The mill is filled with alumina balls, approximately ¼" in diameter, which occupy 40% of the volume of the mill. It also contains 350 cc. of a high boiling hydrocarbon, having a flash point of 185° F. After milling overnight at 60 r.p.m., the product is recovered by filtering, washing with hexane, and drying in a vacuum oven. A 25 gram sample is pressed under the same conditions as used in Examples 17 and 18, and the resulting interdispersion is characterized in a similar fashion. It has an impact strength of 5.3 ft. lbs./in.$^2$, a Rockwell A hardness of 90.1, an average transverse rupture strength of 96,325 p.s.i., and a density of 6.98 g./cc. which is 96.14% of the theoretical density of 7.26 g./cc. for this composition. The interdispersion is composed of about 2.94 parts by volume aluminum nitride per part by volume of metal.

On being tested as a cutting tool, on 4340 steel as described in Example 17, this interdispersion shows a flank wear of 5 mils, a total crater width of 25 mils and a crater depth of ¼ mil after 3 minutes cutting at 340 surface feet per minute. After 3 minutes at 500 surface feet per minute, the corresponding figures are a flank wear of 9 mils, a crater width of 27 mils, and a crater depth of ¾ mil. After cutting 30 seconds at 1000 surface feet per minute, the figures are 4 mils flank wear, 20 mils crater width, and a crater depth of ½ mil. Even after cutting at 1500 surface feet per minute, the flank wear after one minute of cutting is only 12 mils, the crater width about 22 mills, and the crater depth 1½ mills. The tool develops no thermal cracking during any of these tests.

A metallographic examination of this refractory interdispersion shows a uniform distribution of the metallic component throughout the structure. The effect of using the fine particle sized tungsten metal powder is also shown by the small average particle size of the metal which ranges from less than 1 micron to about 4 microns, and of the non-metallic components which are all substantially less than 2 microns in average size. This refractory represents one of the preferred embodiments of the invention. It has a continuous phase of metal as shown by its extremely low electrical resistivity of 0.034 milliohm/cm. The improved distribution and the effect of a continuous metal phase can also be noted in the good transverse rupture strength, the high hardness, and in cutting tool performance.

EXAMPLE 6

Sixty-one grams of the tungsten metal powder prepared as described in Example 5 are mixed with 5 grams of chromium metal powder —325 mesh, and 34 grams of the aluminum nitride prepared as described in Example 4. This mixture is milled in 350 cc. of a high boiling hydrocarbon solvent in 1.1 liter capacity rubber-lined steel ball-mill. The mill is filled to 40% of its volume with ¼" diameter alumina balls. After milling for 14 hours at 60 r.p.m., the resulting intimate mixture is recovered by centrifugation and washed with hexane until the resulting product is free of the hydrocarbon oil used as a milling fluid. Twenty-five grams of this composition is hot pressed under the conditions described in Example 4. The resulting refractory consists of about 2.67 parts by volume of aluminum nitride per part by volume of a tungsten-chromium alloy containing 13.2 weight percent chromium.

The average rupture strength of this refractory is 67,250 p.s.i., its impact strength is 6.1 ft. lbs./in.$^2$, its Rockwell A hardness is 88.9, and its density 6.87 g./cc. This is 97.44% of the theoretical density.

Metallographic examination of the structure of the refractory shows an extremely uniform interdispersion of metal and aluminum nitride, with the particle size of the nitride ranging from about 2 to 4 microns, and that of the metal ranging from less than 1 micron to about 10 microns. The existence of a continuous metal phase is shown by measurement of the electrical resistivity, which is 0.035 milliohm/cm. The rupture strength and the impact strength are good, as is the cutting tool performance, discussed below.

A portion of this refractory is machined to prepare a cutting tool insert and tested as in Example 17. The following performance was demonstrated: At 340 surface feet per minute, the flank wear is 6 mils, the crater width 25 mils, and the crater depth ½ mil, after a cutting time of 3 minutes. On cutting 3 minutes at 500 surface feet per minute, the flank wear is 8 mils, the crater width 27 mils, and the crater depth 1 mil. On cutting 1 minute at 1500 surface feet per minute, the flank wear is 25 mils, the crater width 18 mils, and the crater depth 1½ mil. The tool shows good resistance to heat cracking.

EXAMPLE 7

Seventy-seven and two-tenths grams of the tungsten metal of Example 5 are milled with 19.5 grams of the aluminum nitride of Example 4. Milling is performed in a 1.1 liter rubber-lined ballmill, filled to 40% of its volume with ³⁄₁₆" steel balls, and 350 cc. of a high boiling hydrocarbon oil. Milling is performed at 60 r.p.m. for 24 hours. The resulting intimately mixed tungsten, aluminum nitride powder is recovered from the balls and washed free of the hydrocarbon solvent with hexane, and dried in a vacuum oven. Thirty-six grams of the resulting powder consisting of 1.5 parts by volume of aluminum nitride per part by volume of tungsten, is pressed under the conditions described in Example 4, except the maximum pressure imposed is 6000 p.s.i.

The resulting refractory interdispersion exhibits a rupture strength of 148,000 p.s.i., an impact strength of 7.4 ft. lbs./in.$^2$, a Rockwell A hardness of 85.6, and a density of 9.46 g./cc. This represents 98% of the theoretical density of 9.67 g./cc. calculated for this refractory. The refractory is tested as a cutting tool on cast iron and shows exceptional performance even on interrupted cuts and at high speeds. The cutting edge remains free from thermal cracks during these tests.

EXAMPLE 8

Forty-one and five tenths grams of the tungsten metal powder of Example 5 and 22.8 g. of the aluminum nitride powder of Example 4 are mixed with 17.8 g. of —325 mesh rhenium metal powder and milled under the same conditions as Example 4. Pressing conditions are also the same as those employed in Example 4, except that a holding time of 15 minutes at 2000° C. is used instead of a holding time of 5 minutes at this temperature. The resulting refractory interdispersion contains about 2.33 parts by volume of aluminum nitride per part by volume of an alloy containing 70 weight percent tungsten and 30 weight percent rhenium. Its transverse rupture strength is 200,000 p.s.i., Rockwell A hardness 91.5, impact strength 45 ft. lbs./in.$^2$, and density 7.20 g./cc., representing greater than 99.5% of the theoretical density for this composition. X-ray examination shows that the interdispersion consists of aluminum nitride and a tungsten-rhenium alloy phase. This interdispersion is employed as a cutting tool in machining cast iron, stainless steel, 4340 steel, as well as several nickel-chromium based superalloys containing aluminum and titanium as precipitation hardening agents. Its cutting performance on these metals is outstanding, exhibiting almost negligible wear even at the highest cutting speeds on all but the superalloys. Even with these extremely hard and strong alloys, it is found possible to cut without excessive wear or thermal cracking at high speeds.

EXAMPLE 9

One thousand three hundred and sixty grams of $-325$ mesh molybdenum metal powder is placed in a 1 gal. steel ballmill filled to 40% of its volume with steel balls and also containing 1800 cc. of a high boiling hydrocarbon oil. This is milled at a speed of 60 r.p.m. for 3 days, after which the molybdenum powder is separated from the hydrocarbon oil and the steel balls, washed thoroughly with hexane to remove the oil, and dried in a vacuum oven. It is purified with a hydrochloric acid-water treatment in a manner identical to that described for the purification of the tungsten metal powder of Example 5. The resulting, finely divided, molybdenum metal powder has an average particle size of from 100 to 200 millimicrons, and contains only traces of iron as an impurity.

Twenty-six grams of this molybdenum metal powder are mixed with 24.4 grams of the aluminum nitride powder of Example 4 and to this is added .6 gram of zirconium hydride. This mixture is milled and recovered as described in previous examples, and 20 grams of it are pressed at 2000° C. using the pressing cycle described in Example 4. The resulting refractory interdispersion exhibits a transverse rupture strength of 160,000 p.s.i., an impact of 30 ft./lbs./in$^2$, a Rockwell A hardness of 90.5, and a density of 5.05 g./cc. which represents 99% of theoretical density. The interdispersion contains 25 volume percent of a molybdenum-zirconium alloy which is 98 weight percent molybdenum.

The interdispersion performs exceptionally well as a cutting tool on a variety of metals and alloys, with minimum wear. The alloys tested include bronze, an abrasive aluminum-copper percipitation-hardened alloy, a cobalt based superalloy containing chromium and tungsten and carbon as hardening agents, cast iron, and 4340 steel. Only very minor wear rates are encountered using cutting speeds up to 1500 surface feet per minute on all alloys but the cobalt-based superalloy. This alloy can be cut with relatively low wear at a rate up to 400 surface feet per minute. This cutting tool composition is particularly outstanding on interrupted cuts on steel and cast iron, due presumbly to its high impact strength, mechanical strength, resistance to thermal cracking, and hardness.

EXAMPLE 10

Forty-eight and two tenths grams of a sample of tungsten metal powder containing dispersed within it 1% by weight of 100 millimicron particles of thoria are mixed with 24.5 grams of the aluminum nitride of Example 4. This is milled for 24 hours in a 1.1 liter rubber-lined mill containing 350 cc. of a high boiling hydrocarbon solvent and filled to 40% of its volume with $\frac{1}{16}''$ steel balls. The milling speed is 60 r.p.m. After recovery and removal of the oil as described in previous examples, 25 g. of this material are pressed at a temperature of 2200° C. with a holding time of 1 minute at the top temperature under a pressure of 4000 p.s.i. which is first imposed at 2000° C. The resulting refractory interdispersion consists of about 0.09 part by volume thoria and 3.26 parts by volume aluminum nitride per part by volume of tungsten metal. Its transverse rupture strength is 110,000 p.s.i., its density is 7.20 g./cc., the Rockwell A hardness is 90.9, and the impact strength is 20 ft./lbs./in.$^2$. The density represents 96.2% of the theoretical density for this composition.

This composition is particularly useful as a cutting tool for interrupted cuts because of its good resistance to heat cracking.

EXAMPLE 11

An ammonium tungstate solution is prepared by dissolving tungstic oxide in an excess of concentrated ammonium hydroxide. This solution contains 11.2% tungstic oxide. Six thousand three hundred and seventeen grams of the ammonium tungstate solution is adjusted to a volume of 6 liters 1821 g. of a 22% titania sol, the titania being in the form of 20 millimicron spherical aggregates of 5 to 10 millimicron particles, is mixed with 1713 g. of a 3.5% alumina sol, the alumina being in the form of 20 millimicron particles. The pH of the mixed sols is adjusted to 1 with hydrochloric acid, and the mixture is then adjusted to a total volume of 6 liters. Twenty-nine hundred seventy cc. of an 18.5% aqueous hydrochloric acid solution is adjusted to 6 liters in volume with water. A 6 liter heel of distilled water is adjusted to a pH of 1 with hydrochloric acid.

The solution of the mixed sols of titania and alumina, the solution of the ammonium tungstate, and the solution of the hydrochloric acid-water are run at equal rates simultaneously into the vigorously agitated heel.

The resulting precipitated mixture of tungstic oxide, titanium dioxide, and alumina are washed by decantation and centrifugation, and dried in an air oven overnight at 250 to 300° C. The weight recovered at this stage is 1076 g. This material is then fired in a furnace at 400–450° C. overnight, and the weight decreases to 956 g. This material is then hydrogen reduced in an electrically heated furnace under a current of pure dry hydrogen, first at 600° C. and finally at 1000° C. Under these conditions, the tungstic oxide is transformed to tungsten metal in a colloidal mixture with titanium monoxide and alumina.

Eight hundred twenty-six grams of this mixture are recovered, and analysis shows it has an oxygen content at this point of 22.1%. One hundred forty-one grams of carbon is blended with this material and it is heated in a ceramic tube furnace in a nitrogen atmosphere to a temperature of 1250° C. The atmosphere is then changed to one of ammonia and the system is held at 1250° C. for 15½ hours, following which it is heated up to 1550° C. and held at this temperature for 22½ hours.

The resulting product is a mixture on an intimate colloidal scale of metallic tungsten and titanium nitride, with a small amount of alumina and aluminum nitride. X-ray examination of this powder shows it to consist of tungsten crystallites, 30 millimicrons in diameter, along with titanium nitride, 17.5 millimicrons in diameter. The alumina and aluminum nitride are below the limit of X-ray detection.

The product is somewhat aggregated, as indicated by its nitrogen surface area of 2 m.$^2$/g., which is considerably less than that which should be obtained for a mixture of non-aggregated crystals of the size indicated by X-rays.

Two hundred seventy-four grams of this composition, 1.5 grams of a one micron sized pure cobalt powder, and 4996 g. of tungsten rod inserts are loaded into the steel-lined ballmill, along with 180 cc. of non-volatile hydrocarbon oil. The capacity of the mill is about 1300 cc. Milling is performed at a speed of 60 r.p.m., for 5 days.

During milling, 13 grams of tungsten is picked up by the product from the tungsten rod inserts due to partial attrition during the milling operation. This powder is found by chemical analysis to be composed of 2.59 parts by volume of titanium nitride and 0.58 part by volume of alumina per part by volume of the metal which is 98% by volume tungsten and 2% by volume cobalt.

A number of refractory samples are fabricated from this powder by hot pressing at a temperature of 1800 to 1845° C., using a pressure of 4000 p.s.i. and a hold at temperature of 1 minute. The average properties obtained are a density of 8.52 g./cc., a Rockwell A hardness of 90, a transverse rupture strength of 158,000 p.s.i., and an impact strength of 37 ft. lbs./in.[2]. The theoretical density for this composition calculated by assuming that the specific volumes of the constituents are additive, is 8.50 g./cc.

This refractory interdispersion proves to be an excellent cutting tool, as shown in the following tests. Samples of a hardened steel, grade 4340, of Brinnell hardness 351, are turned on a lathe using a feed of 10 mils, a depth of cut of 50 mils, and a speed expressed in surface feet per minute (s.f.m.) of 900. After 3 minutes of cutting, the average flank wear is approximately 5 mils, the highest local wear observed is 6 to 8 mils, and the crater depth is about 1.25 mils.

In a turning test where the feed is 30 mils, the depth of cut 1/8" and the surface speed 300 s.f.m., turning for 1 minute gives a local wear of 2 mils and average wear of 2 mils, and a zero crater depth. Tool life curves are run on the same steel, using a speed of 500 s.f.m., a 20 mil feed, and a 1/16" depth of cut, and the tool performs without failure for a period of 19 minutes and 45 seconds. At the conclusion of this test, the wear and cratering are not excessive, although a small amount of chipping causes some deterioration in the surface finish of the refractory interdispersion at this point. Under similar conditions at a speed of 400 s.f.m., the life of this refractory is 14 minutes and 15 seconds.

As a further indication of the exceedingly high toughness of this tool, it is used as a single tooth in a milling head by climb milling to cut malleable cast iron at a depth of cut of 1/10", a feed of 40 mils per tooth, and a speed of 196 s.f.m. No observable crater wear or flank wear, and no failure of the tool results, even after cutting 66 inches of metal, at which point the test is stopped.

Thus, this tool performs in an outstanding fashion and develops no thermal cracking lines under both the heaviest type of practical milling conditions, and under conditions where only the most wear resistant ceramic tools are normally employed.

EXAMPLE 12

A steel ballmill with a volume of 1.3 liters is loaded with 114 grams of finely divided titanium nitride, 17.1 grams of aluminum nitride, and 90 g. of ballmilled tungsten. Also loaded into the mill is 450 g. of a hydrocarbon oil having a flash point of 130° C., and 5.75 kg. of tungsten inserts. This mixture is ballmilled for 5 days. Recovery of the product is effected by transferring the slurry from the ballmill into a resin kettle, the slurry settles, and the supernatant liquid is siphoned off. The wet cake is repeatedly washed with hexane and is then dried under vacuum. The resin kettle with the dry powder is opened in an inert atmosphere in a dry box, and is screened through a U.S. 70 mesh sieve.

One sample of this 70 mesh powder interdispersion is hot pressed according to the following procedure: The sample is heated to 1900° C. in a graphite mold and held for 6 minutes. Four thousand p.s.i. pressure is then applied and held for a total of 5 minutes, and the sample is then allowed to cool rapidly. This is done under 1/2 atmosphere of nitrogen.

The resulting specimen has a transverse rupture strength of 136,100 p.s.i., an impact strength of 6 ft. lbs./in.[2], and a Rockwell A hardness of 90.1. The density of 7.7 g./cc. is 100% of theoretical for this composition, which contains about 3.4 parts by volume titanium nitride and about 0.8 part by volume aluminum nitride per part by volume of tungsten.

This refractory interdispersion is machined into a cutting tool insert and employed as a cutting tool on 4340 grade steel. This is an excellent high speed cutting tool at 900 surface feet per minute, using a feed of 10 mils per revolution and a depth of cut of 50 mils. After 3 minutes of operation, it has an average flank wear of only 7 mils, and a crater depth of 1 mil. At 300 surface feet per minute, also on 4340 grade steel, using a heavy feed of 30 mils and a depth of cut of 1/8", this tool cuts satisfactorily and resists fracture. After one minute it has an average flank wear of only 3 mils, and no measurable crater wear.

This tool machines for 30 minutes without failure on 4340 steel, at 370 surface feet per minute, a 1/8" depth of cut and 20 mil feed, and has a flank wear of only 4 mils and a crater depth of 1 mil. The finish on the work ipece is excellent.

The cutting tool exhibits no thermal cracking lines at the conclusion of the tests.

EXAMPLES 13–27

The following examples illustrate other interdispersions which are prepared in a manner similar to that described in Example 1. The specific conditions used in the milling and hot pressing operations, the chemical analysis of the powder, and the nominal composition and properties of the pressed pieces are listed in the attached Tables 1 and 2. The performance of the refractory interdispersions as cutting tips is decsribed separately for each example, however, all of the tips are hard and strong and resistant to thermal cracking.

TABLE I

| Example No. | Starting material amounts (grams) | | | | | Ball milling conditions | | | Powder analysis | | | | X-ray crystal size (Mμ) | |
|---|---|---|---|---|---|---|---|---|---|---|---|---|---|---|
| | TiN | AlN | Al₂O₃ | W | Co | Inserts | Weight (grams) | Milling time | Percent C | Percent O | Percent N | N₂ surface area, m.₂/g. | TiN | W |
| 12 | 114 | 17.1 | | 90.0 | | W | 5.75 | 5 days | 1.15 | 1.68 | 10.26 | 10 | 19 | 30 |
| 13 | 114 | 17.1 | | 90.6 | 1.6 | W | 5.58 | 6 days | 1.34 | 1.80 | 8.64 | 8.6 | | |
| 14 | 66.6 | 9.9 | | 90.0 | | W | 7.86 | 5 days | 1.11 | 2.01 | 8.37 | 11 | 19 | 27 |
| 15 | 89.5 | 17.4 | | 125 | | W | 6.64 | 5 days | 0.24 | 3.12 | 9.07 | | 22 | 30 |
| 16 | 64.0 | ¹6.2 | | 60 | | W | 7.00 | 16 hours | 0.81 | 0.80 | 11.39 | 5.6 | 37 | 29 |
| 17 | 72.8 | ¹7.0 | | 77.2 | | WC | 3.44 | 15 hours | | | | | | |
| 18 | 94.0 | | 17.2 | 100 | | W | 7.50 | 8 days | 1.18 | 4.80 | 6.39 | 8.8 | 27 | 23 |
| 19 | 114 | 17.1 | | 169 | | WC | 4.00 | 5 days | 1.50 | 1.43 | 8.00 | 8.6 | | |
| 20 | 63 | 9.45 | | 69.5 | | W | 4.70 | 16 hours | 0.81 | 0.94 | 11.10 | 6.1 | 40 | 25 |
| 21 | 54.3 | 8.15 | | 104.2 | | W | 4.72 | 16 hours | 0.73 | 0.70 | 8.34 | 5.5 | 32 | 25 |
| 22 | 47.8 | 7.17 | | 139.0 | | W | 4.71 | 16 hours | 0.63 | 0.72 | 5.57 | 4.6 | 39 | 25 |
| 23 | 114 | 17.1 | | 55.2 | 1.2 | W | 5.00 | 6 days | 1.23 | 2.08 | 9.54 | 11 | 22 | 33 |
| 24 | 39.9 | ¹1.78 | | 16.6 | | W | 6.38 | 16 hours | | | | | | |
| 25 | 36.1 | ¹2.51 | | 25.0 | .38 | W | 6.24 | 16 hours | | | | | | |
| 26 | 43.5 | | | 30 | | W | 7.00 | 16 hours | | | | | | |
| 27 | 43.5 | | | 7.0 | .19 | W | 6.31 | 16 hours | | | | | | |

¹ Atomized aluminum replacing aluminum nitride.

TABLE II

| Example No. | Pressing conditions | | | Mechanical Properties | | | Refractory composition | | | Metal phase composition | | |
|---|---|---|---|---|---|---|---|---|---|---|---|---|
| | Goal temp. (° C.) | Hold time (min.) | Atmos. | Trans. rupture strength (p.s.i.) | Rockwell A hardness | Observed density/ calc. density (g./cc.) | Parts refractory per part metal (by volume) | | | | | |
| | | | | | | | TiN | AlN | Al$_2$O$_3$ | Percent W | Percent Co | Percent Others |
| 12 | 1,900 | 6 | N$_2$ | 136,100 | 90.1 | 7.7/7.75 | 3.4 | .8 | | 100 | | |
| 13 | 1,750 | 5 | N$_2$ | 176,300 | 90.2 | 8.23/8.35 | 2.1 | .6 | | 97.9 | 2.1 | |
| 14 | 1,810 | 2 | Vacuum | | 90.4 | 9.07/9.12 | 2.1 | .5 | | 100 | | |
| 15 | 1,800 | 1 | do | 148,400 | 86.2 | 8.71/8.53 | 2.9 | .6 | | 100 | | |
| 16 | 1,500 | 4 | do | 150,400 | 88.8 | 8.06/7.86 | 3.0 | .6 | | 100 | | |
| 17 | 1,600 | 4 | do | 168,500 | 88.8 | 7.96/8.01 | 3.4 | .5 | | 100 | | |
| 18 | 1,800 | 2 | do | 105,900 | 90.6 | 8.49/8.69 | 2.9 | | .6 | 100 | | |
| 19 | 1,900 | 6 | do | 131,600 | 91.0 | 8.53/8.86 | 2.4 | .6 | | 84.6 | | 14 WC/1.5 Co |
| | 1,800 | 4 | do | 127,400 | 91.3 | 8.65/8.86 | 2.4 | .6 | | 84.6 | | 14 WC/1.5 Co |
| 20 | 1,850 | 4 | do | 104,000 | 87.8 | 7.60/7.97 | 3.1 | .8 | | 100 | | |
| 21 | 1,850 | 4 | do | 123,700 | 86.0 | 8.99/9.43 | 1.8 | .4 | | 100 | | |
| 22 | 1,825 | 4 | do | 164,500 | 84.1 | 10.71/10.61 | 1.2 | .3 | | 100 | | |
| 23 | 1,780 | 5 | do | | | 7.73/7.86 | 3.1 | .8 | | 97.5 | 2.5 | |
| 24 | 1,700 | 4 | do | 136,600 | 89.0 | 7.97/8.03 | 3.7 | .3 | | 100 | | |
| 25 | 1,600 | 4 | do | 138,900 | 87.4 | 8.13/8.05 | 3.5 | .5 | | 98.1 | 1.9 | |
| 26 | 1,750 | 4 | do | 116,400 | 88.4 | 8.50/8.56 | 3.4 | | | 100 | | |
| 27 | 1,750 | 4 | do | 92,600 | 88.2 | | 6.0 | | | 97.2 | 2.8 | |

EXAMPLE 13

A cutting tool is fabricated as described in Example 1 from the pressed billet shown for Example 24 in Tables 1 and 2. This cutting tool is tested on 4340 grade steel at 500 surface feet per minute, using a 10 mil feed and 50 mil depth of cut. The tool performs satisfactorily. After 3 minutes without failure, it exhibits an average flank wear of 4 mils and a crater depth of only 1 mil. At 200 surface feet per minute, using a 1/16" depth of cut and a 30 mil feed, this tool exhibits no flanking wear and no crater wear, when operated for 1 minute. In another test at 300 surface feet per minute, using again a 1/16" depth of cut and a 20 mil feed, this tip operates for 30 minutes without failure, giving an excellent finish to the work piece, and has a flank wear of only 4 mils and a crater depth of only 1 mil. This tool displays outstanding resistance to thermal cracking.

EXAMPLE 14

A molybdenum tray is loaded with 73 g. of an active colloidal titanium nitride in an inert atmosphere, and is transferred into a ceramic tube furnace. This material is fired for 16 hours at 1200° C. under an ammonia atmosphere. The furnace is opened in air and 69 g. of a friable brown powder is recovered. This material has the following analysis: 2.16% oxygen, 0.04% carbon, 77.1% titanium, and 20.55% nitrogen. This powder has a surface area of 7.3 m.$^2$/g., corresponding to a particle size of 155 millimicrons, and X-ray examination reveals the only phase present to be titanium nitride. A refractory dispersion is prepared from this titanium nitride, in combination with aluminum nitride and tungsten, as in Example 12, but using the conditions shown in Tables 1 and 2 and Example 14. The cutting tool made from this material performs in an excellent manner when used to cut 4340 steel. At a surface speed of greater than 900 surface feet per minute and a 50 mil depth of cut and 10 mil feed, this tool exhibits a flank wear of 4 mils and a crated depth of 2 mils, when allowed to cut for 3 minutes. This tool operates without failure and produces an excellent finish on the work piece. On 4340 steel at 435 surface feet per minute, employing a 1/8" depth of cut and a 30 mil feed, it has a flank wear of only 2 mils and no measurable crater wear after one minute of operation. This cutting tool is used to clean the scale from a new log of 4340 steel, and cuts for a total length of 36" with a flank wear of only 4 mils and a crater depth of 2.5 mils, giving an excellent finish to the work piece. The conditions here are 320 surface feet per minute, 20 mil speed and 1/8" depth of cut.

EXAMPLE 15

From the hot pressed billet prepared for Example 15 as shown in Tables 1 and 2, a cutting tool is prepared. This cutting tool tested on cast iron at 500 surface feet per minute, using a 20 mil feed and a 50 mil depth of cut, cuts for 91 minutes without failure. Also on cast iron and at 760 surface feet per minute, with the same conditions of depth of cut and feed, it cuts for 43 minutes without failure.

Another pressed interdispersion from this same powder gives a cutting tool having a tool life of 43 minutes and 30 seconds on 4340 steel, at 400 surface feet per minute, 20 mil feed and a 1/16" depth of cut. The same tip is used in climb milling on malleable cast iron at 196 surface feet per minute, using a depth of cut at 100 mils and a feed of 40 mils per tooth and cuts a total of 23 1/8" before failure.

EXAMPLE 16

Using commercial titanium nitride, a hot pressed refractory dispersion is prepared as in Example 12, using the conditions shown for Example 38 in Tables 1 and 2. A cutting tool is prepared from this material which performs in an excellent manner on steel at 400 surface feet per minute, and shows low wear and long tool life.

EXAMPLE 17

A cutting tool is fabricated as described in Example 12, using a finely divided titanium nitride. This is a hard, tough cutting tool, and performs satisfactorily on steel at 300 surface feet per minute, with long tool life.

EXAMPLE 18

A high speed cutting tool is prepared from the hot pressed refractory interdispersion shown for Example 18 in Tables 1 and 2. This is prepared following the procedure of Example 12, and is a thermally shock stable cutting tool. This cutting tool cuts for 9 minutes and 12 seconds on 4340 steel of Brinnell hardness 203, when tested at 550 surface feet per minute, using a 20 mil feed and a 1/16" depth of cut.

EXAMPLE 19

The first cutting tool of Example 19 in Tables 1 and 2 is tested on 4340 steel and performs in an excellent manner, as shown by the following: At 850 surface feet per minute, using a 50 mil depth of cut and a feed of 10 mils, this tool machines for 3 minutes without failure and has a flank wear of only 4 mils and a crater depth of only 1.5 mils. At 370 surface feet per minute, using a 1/8" depth of cut and a 20 mil feed, this tool operates for 1 minute with a flank wear of only 1 mil and no measurable crater wear. Also at 370 surface feet per minute, with a 1/8" depth of cut and a 30 mil feed, it performs in an excellent manner for 15 minutes and 27 seconds.

The second cutting tool, prepared from the same powder interdispersion, with properties shown in the tables, also displays excellent cutting tip properties when tested on 4340 steel at 1000 surface feet per minute. It performs satisfactorily for 3 minutes, with a flank wear of only 3 mils and a crater depth of 5.5 mils. At 325 surface feet per minute, it cuts satisfactorily for 10 minutes with a flank wear of only 2 mils and a crater depth of only ¼ mil. In a test of climb milling on malleable cast iron, this cutting tip shows toughness exceeding that of other commercial cutting tips used on this type of material. This tool is tested at 257 surface feet per minute, 100 mil depth of cut at feeds of 8.2 mils, 17 mils, and 37.5 mils. Under all of these conditions it runs satisfactorily without failure.

EXAMPLE 20

The hot pressed billet shown for Example 20 in Tables 1 and 2 is machined into a cutting tool and is tested on 4340 steel of Brinnell hardness greater than 307. This tool at a surface speed of 370 surface feet per minute, a ⅟₁₆″ depth of cut, and 20 mil feed, has a tool life of 66 minutes and 30 seconds. At 530 surface feet per minute, this tool has a life of 8 minutes.

EXAMPLE 21

A refractory interdispersion is prepared as in Example 12, and under the conditions shown in Tables 1 and 2 for Example 21. This material makes a strong, tough cutting tool, which has a tool life of 23 minutes and 30 seconds on 4340 steel at 400 surface feet per minute.

EXAMPLE 22

An extremely tough and strong refractory interdispersion shown for Example 22 in Tables 1 and 2 is fabricated into a cutting tool for steel and tested on 4340 steel at 410 surface feet per minute, using a ⅟₁₆″ depth of cut and a 20 mil feed. This performs satisfactorily for greater than 9 minutes on 4340 steel.

The next five examples are prepared as in Example 12, except that after the milling period indicated in the table for the slurry of the titanium nitride and aluminum nitride, the finely divided tungsten is added to the ballmill and dispersed in the slurry by an additional two hour milling.

EXAMPLE 23

A hard refractory cutting tool for steel is prepared in Example 12, from the refractory interdispersion shown for Example 23 in Tables 1 and 2. In machining tests on 4340 grade steell at 1000 surface feet per minute, using a 50 mil depth of cut and a 10 mil feed, this refractory cutting tool as a flank wear of 4 mils and a crater depth of 1.5 mils, after cutting for 3 minutes without failure. On the same steel at 360 surface feet per minute, with a ⅛″ depth of cut and a 30 mil feed, this tool exhibits a flank wear of only 1 mil and no measurable crater wear after 1 minute of operation. This tool is unusually resistant to thermal cracking.

EXAMPLE 24

A hot pressed billet is prepared in the same manner as that of Example 12, with the exceptions noted above. The method of preparation and physical properties are given in Tables 1 and 2.

A cutting tool fabricated from this material is an excellent cutting tool on steel and cast iron, when used at a feed of 300 to 500 surface feet per minute, a depth of cut of ⅟₁₆″, and a feed of 10 mils.

EXAMPLE 25

This composition shown in Tables 1 and 2 and prepared as described above is an excellent cutting tool on cast iron, at 400 surface feet per minute, a depth of cut of ⅛″ and a feed of 20 mils.

EXAMPLE 26

A cutting tool is fabricated as described in Example 12, from the pressed refractory interdispersion shown for Example 26 in Tables 1 and 2. This cutting tool has excellent wear resistance when used to cut 4340 steel at 300 surface feet per minutes using a depth of cut of ⅛″ and a feed of 10 mils.

EXAMPLE 27

The hot pressed refractory interdispersion shown in Tables 1 and 2 for Example 27 is fabricated into a steel cutting tip. This tool exhibits exceptional wear resistance and thermal shock stability, and will cut steels at speeds up to 500 surface feet per minute, with good tool life.

EXAMPLE 28

A ballmill is loaded with 92 grams of commercial vanadium nitride, −325 mesh, and ballmilled for 5 days in a steel mill with 6000 g. of tungsten inserts and 150 g. of a hydrocarbon oil. To this ballmilled slurry of finely divided vanadium nitride is added 77.8 g. of a previously ballmilled tungsten powder. This is then mixed for 2 hours by ballmilling. The resulting slurry is then transferred to a resin kettle and is dried under vacuum. The dried powder is then unloaded in an inert atmosphere and screened through a 70 mesh screen. One sample of this powder interdispersion is fabricated into a hot pressed billet and cutting tool as described in Example 12. Mechanical tests on this interdispersion give the following results: transverse rupture strength of 112,200 p.s.i., Rockwell A hardness of 86.4, and a density of 9.18 g./cc. This density is nearly 98% of that expected for this material, which has a nominal composition of 3 parts by volume vanadium nitride per part by volume of tungsten metal.

This material is a good cutting tool for steel, showing good resistance to wear and to thermal shock.

EXAMPLE 29

Thirty-six grams of colloidal corundum powder having a surface area of 29 m.$^2$/g. and an average crystallite size of around 40 millmicrons are loaded into a 2 quart steel mill with 40 g. of the titanium nitride powder of Example 1, six grams of the aluminum nitride powder of Example 4, and 93 grams of the tungsten metal powder of Example 5.

Three hundred forty-five milliliters of a high boiling hydrocarbon oil having a flash point of 185° F. and 6622 grams of tungsten metal rod inserts are also loaded into the mill. The tungsten metal inserts are in the form of small cylinders, ¼″ in diameter and ¼″ long. The mill is loaded and closed in a nitrogen atmosphere to prevent oxidation of the material during the milling operation. The mill is rotated on rubber-lined rollers for a period of 5 days at 90 revolutions per minute.

The mill is connected to a vacuum system and the contents are dried in vacuum by heating the outside of the mill with water vapor. The resulting finely divided powder interdispersion of alumina, nitrides and metal is recovered from the mill and separated from the tungsten inserts. These operations are carried out in a nitrogen atmosphere.

The tungsten inserts lose 29 g. in the 5 day milling operation. This amount, added to the 93 g. of tungsten metal powder originally loaded into the mill, gives a total of 122 g. of tungsten metal incorporated into the composition.

Chemical analysis of the powder interdispersion shows that it contains about 18% $Al_2O_3$, 20% TiN, 3% AlN, and 59% W. Surface area is 11 m.$^2$/g.

Twenty-three grams of this powder are placed in a carbon mold, in an inert atmosphere, using molybdenum metal discs as separators. The temperature is raised to 1775° C. under vacuum, and after 5 minutes a pressure of 4000 pounds per square inch is imposed. Temperature and pressure are held for 2½ minutes. Pressure is then removed, the sample is allowed to cool and is then removed from the furnace.

The resulting refractory compact of this invention is cut with a diamond saw into specimens for testing transverse rupture strength, impact strength, hardness on the Rockwell A scale, and density. One section is machined in the form of a metal cutting tool insert. The transverse rupture strength is 125,000 p.s.i., the impact strength is 17 ft. lbs./in.$^2$, and the Rockwell A hardness is 91.8. The density is 8.12 g./cc., which is greater than 99% of the theoretical density to be expected for this composition, based on the specific volumes of the original components.

Metallographic examination of the compact shows that the alumina, the tungsten and the nitride phase are present within a square region 10 microns on edge, and of ten such 100 sq. micron regions examined, all exhibit these same structural characteristics. The compacts contain 1.5 parts of alumina, 1.2 parts of titanium nitride and 0.3 part of aluminum nitride per part of tungsten.

A cutting tool insert of this composition is tested on 4340 steel, using a depth of cut of ⅛", a surface speed of 300 surface feet per minute, and a feed rate of 0.030" per revolution. After 1 minute of cutting, the flank wear is 2 mils and the crater depth is ½ mil.

This cutting tool insert can cut 4340 steel at a speed of 900 surface feet per minute, using a depth of cut of 0.050" and a feed rate of 0.010" per revolution. Under these conditions the average flank wear is 6 mils in 3 minutes, and the crater depth is 1 mil.

Another cutting tool of this composition is used as a single tooth in a milling head by conventional milling, to cut hardened steel, grade 4340, of Brinnell hardness 330, at a depth of cut of 50 mils, a feed of 7 mils per tooth, and a speed of 474 surface feet per minute. Average flank wear is only 12 mils, and no failure or chipping of the tool results, even after cutting 240 inches of metal, at which point the test is stopped. Surface finish of the metal at this point is still very good. A commercial wear resistant cutting tool of tungsten carbide modified with titanium carbide and tantalum carbide tested under the same conditions, cuts only 48 inches of metal, at which point the test is stopped due to deterioration in the surface finish of the metal. Average flank wear of the commercial tool at this point is 24 mils.

Still another tool of this composition is used as a single tooth in a milling head by climb milling to cut malleable cast iron at a depth of cut of ⅒", a feed of 40 mils per tooth, and a speed of 196 surface feet per minute. No crater or flank wear, and no failure of the tool results, even after cutting 66 inches of metal, at which point the test is stopped.

This cutting tool material is one of the most preferred embodiments of this invention and is highly resistant to thermal cracking.

EXAMPLE 30

Fifty-one grams of the alumina powder of Example 29, 55 g. of titanium nitride powder of Example 1, 8 g. of aluminum nitride powder of Example 5, and 81 g. of molybdenum metal powder of Example 3 are placed in a ballmill with 350 milliliters of hydrocarbon oil and 4883 g. of molybdenum metal rod inserts.

Milling is carried out as described in Example 29 as is the recovery of the final product. The molybdenum inserts do not show weight loss during the milling operation.

The resulting intimate interdispersion of this invention is shown by chemical analysis to contain 25.5% by weight $Al_2O_3$, 27.5% TiN, 4% AlN, and 43% Mo.

Seventeen grams of this powder are placed in a carbon die and pressed in the equipment described in Example 51, using the same pressing conditions at 1725° C. The resulting refractory interdispersion has a transverse rupture strength of 125,000 p.s.i., an impact strength of 14 ft. lbs./in.$^2$, and a Rockwell A hardness of 91.8. The density is 5.86 g./cc., which is 100% of the theoretical density to be expected for this composition.

Metallographic examination of the refractory interdispersion shows an interdispersion of alumina, molybdenum and nitrides. The average X-ray crystallite size of the alumina is 420 millimicrons, the average X-ray crystallite size of the molybdenum is 71 millimicrons, and the average X-ray crystallite size of the titanium nitride is 100 millimicrons. The metallographic examination shows that all of the components are present within a square region of 10 microns on edge, and of ten such 100 square micron regions examined, nine exhibit these same structural characteristics. The dispersion consists of about 1.5 parts of alumina, 1.2 parts of TiN, and 0.3 part of AlN per part of molybdenum.

The cutting tool insert of this material, when used to cut 4340 steel at a speed of 900 surface feet per minute, using a depth of cut of 0.050" and a feed rate of 0.010" per revolution shows no thermal cracking, a flank wear of 6 mils in 3 minutes and a crater depth of 1 mil.

EXAMPLE 31

Two thousand grams of a 325 mesh alpha tabular alumina, commercially available as grade T-61 alumina powder is loaded into a steel mill half filled with steel balls. Two hundred grams of water are added and the mill is rotated at 35 r.p.m. for 144 hours. After the milling operation, the alumina is recovered, treated with a mixture of hydrochloric and nitric acid to remove the iron, washed with water, and dried.

The milled alumina powder has a surface area of about 9 m.$^2$/g. and an average particle size of around 2 microns.

Thirty-six grams of this alumina powder, 40 g. of the titanium nitride powder of Example 1, and 6 g. of the aluminum nitride powder of Example 4 are placed in a ballmill along with 5837 g. of the tungsten inserts used in Example 29, and about 200 milliliters of hydrocarbon oil. Milling is continued for 5 days under conditions as described in Example 29.

The resulting finely divided powder dispersion is recovered from the mill and separated from the tungsten inserts as in Example 29. These operations are carried out in a nitrogen atmosphere.

The tungsten inserts lose 48 g. in the 5 day milling operation.

Seventy grams of tungsten metal powder of Example 5 and all the powder interdispersion previously recovered from the mill are placed in a mill with the same amount of tungsten inserts and hydrocarbon oil used above. Milling is continued for 2 hours, as described in Example 29. The resulting finely divided powder interdispersion of alumina, mixed nitrides and tungsten is recovered from the mill and separated from the tungsten inserts in an inert atmosphere as in Example 29. The tungsten inserts do not lose any weight in the 2 hour milling operation.

Twenty-three grams of the product are placed in a graphite mold in an inert atmosphere. The temperature is raised to 1775° C. under vacuum and 4000 p.s.i. of pressure is imposed after 5 minutes. Temperature and pressure are held for 2 minutes. Pressure is then removed, the sample is allowed to cool and then removed from the furnace.

The refractory compact obtained is substantially dense, resistant to thermal cracking, very strong and has excellent impact strength. This refractory interdispersion is an excellent cutting tool for steel. It contains 1.5 parts of alumina, 1.2 parts of TiN and 0.3 part of AlN per part of tungsten.

A cutting insert of this composition is used as a single tooth in a milling head by convention milling to cut hardened steel, grade 4340, of Brinnell hardness 330, at a depth of cut of 50 mils, a feed of 7 mils per tooth, and a speed of 474 surface feet per minute. Average flank wear is only 20 mils after cutting 96″ of metal, at which point the test is stopped.

EXAMPLE 32

Twenty-seven grams of the alumina powder of Example 29, and 35.7 g. of the titanium nitride powder of the same example, are placed in a ballmill, along with the same amount of tungsten inserts and hydrocarbon oil as described in Example 29.

Milling is carried out in the same way as described in Example 29, as is the recovery of the final product. The tungsten inserts lose 25 g. in the 5 day milling operation.

Sixty-two and two tenths grams of the tungsten metal powder of Example 5 and all the powder interdispersion previously recovered from the mill are placed in a steel mill with the same amount of tungsten inserts and hydrocarbon oil used above. Milling for 2 hours is carried out as described in Example 29, as is the recovery of the product. The resulting finely divided powder interdispersion of alumina, titanium nitride and tungsten is recovered from the mill and separated from the tungsten inserts in an inert atmosphere. There is no weight loss of the tungsten inserts during the milling operation.

Twenty-three grams of this powder are loaded into a graphite mold and heated at 1680° C. After 5 minutes at this temperature, 4000 p.s.i. of pressure are applied and held for 1 minute. The pressure is then released, the sample is allowed to cool and is then removed from the furnace.

The refractory compact obtained is substantially dense, very strong, resistant to thermal cracking, very hard, and is useful for high speed metal turning under conditions where commercial tools are unsatisfactory. It contains 1.5 parts of alumina and 1.5 parts of TiN per part of tungsten.

EXAMPLE 33

Twenty-four grams of the alumina powder of Example 29, 14.1 g. of the titanium nitride powder of Example 1, and 9.03 g. of the aluminum nitride powder of Example 4 are placed in a ballmill, along with the same amount of tungsten inserts and hydrocarbon oil as described in Example 29.

Milling is carried out for 5 days as described in Example 29, and so is the recovery of the product. The tungsten inserts lose 22 g. during this milling operation.

The powder interdispersion obtained is loaded again in a ballmill along with 37.75 g. of tungsten metal powder of Example 5. Milling for 2 hours, drying and recovery of the product are as described in Example 32. The tungsten inserts do not show any weight loss during this milling operation.

Twenty-three grams of this product are placed in a carbon mold and heated in vacuum at 1650° C. After 5 minutes, 4000 p.s.i. of pressure are applied and held for 1 minute. The pressure is then released, the sample is allowed to cool and is then removed from the furnace.

The refractory compact obtained is substantially dense, very strong, and is very hard. It contains 1.95 parts of alumina, 0.84 part of TiN, and 0.8 part of AlN per part of tungsten metal. It is useful for turning metal under high speed conditions at feed rates where commercial ceramic tools fail, and is highly resistant to thermal cracking.

EXAMPLE 34

Sixty grams of the alumina powder of Example 29, 44.18 g. of the titanium nitride of Example 1, and 2.44 g. of the aluminum nitride of Example 4 are placed in a ballmill with 200 milliliters of hydrocarbon oil and 5981 g. of tungsten metal rod inserts.

Milling is carried out as described in Example 29, as is the recovery of the product. The tungsten inserts lose 33 g. in the 5 day milling operation.

The powder interdispersion recovered from the milling operation and 87 g. of the tungsten metal powder of Example 5 are placed in a ballmill with the same amount of tungsten inserts and hydrocarbon oil used in the previous milling operation. Milling is carried out for 2 hours, as described in Example 29, and so is the recovery of the product. The resulting finely divided powder interdispersion of alumina, mixed nitrides and tungsten is recovered from the mill and separated from the tungsten inserts in an inert atmosphere. There is no weight loss of the tungsten inserts during the milling operation.

Twenty-three grams of this powder are loaded into a graphite mold and heated to 1730° C. After 5 minutes at this temperature, 4000 p.s.i. of pressure are applied and held for 1 minute. The pressure is then released, the sample allowed to cool and then removed from the furnace.

The refractory compact obtained is substantially dense, has a transverse rupture strength of 127,000 p.s.i. and an impact strength of 5 ft. lbs./in.$^2$. It contains 2.4 parts of alumina, 1.48 parts of TiN, and 0.12 part of AlN per part of tungsten. It demonstrates outstanding resistance to thermal cracking when used as a tool for cutting metal.

EXAMPLE 35

One hundred and fourteen grams of titanium nitride, 17.1 g. of aluminum nitride, and 50 g. of a finely divided molybdenum powder are loaded into a steel ballmill and ballmilled for 5 days with 3.96 kg. of molybdenum inserts. This slurry is worked up and prepared for pressing and is pressed as in Example 12, except that the powder is held at 1835° C. for 5 minutes before pressure is applied. This resulting refractory interdispersion has a transverse rupture strength of 170,100 p.s.i., a Rockwell A hardness of 90.8, and a density of 6.05 g./cc. Theoretical density for this composition is 6.0 g./cc. The interdispersion consists of about 3.4 parts by volume titanium nitride and about 0.8 part by volume aluminum nitride per part by volume of molybdenum.

This is an excellent tool when used to machine 4340 steel. At a surface speed of 1000 feet per minute, using a 10 mil feed and a 50 mil depth of cut, this tool cuts for 3 minutes without failure, and exhibits a flank wear of only 4 mils and a crater depth of only 1 mil. On 4340 steel at a surface speed of 315 feet per minute, using a 30 mil feed and a ⅛″ depth of cut, this tool cuts without failure for 1 minute, exhibiting a flank wear of only 1 mil and no measurable crater depth. This is also a good cutting tool for climb milling on malleable cast iron running 11 inches without failure, showing a flank wear of only 2 mils, when tested at 348 surface feet per minute, depth of cut of 100 mils, and a feed of 30 mils per tooth. The tools show good resistance to thermal cracking in all of these uses.

EXAMPLES 36–63

In the following examples all powder operations are carried out in an inert atmosphere as in previous examples. The constituents in the form of 10 micron powders are intermixed in the amounts indicated in Table 3 and are ballmilled for 5 days in a 4.8 liter ballmill containing 655 grams of a hydrocarbon oil having a flash point of 85° C., and 13,800 grams of the tungsten carbide-cobalt inserts of Example 1. The constituents are used in an amount sufficient to yield 75 cubic centimeters of milled powder.

The interdispersed powders are recovered from the mill and dried as in Example 1. 3.2 cubic centimeters of each of the milled powders is then loaded into a 1 inch inner diameter 1¾ inch outer diameter graphite mold, the ends of which are capped with 1 inch by ³⁄₁₆ inch graphite discs.

The powder is packed in the mold by tapping the bottom of the mold for about 1½ minutes after inserting the bottom piston. The top piston is then inserted and the mold assembly is transferred under vacuum into the hot zone of a press held at 1100° C. During the transfer the temperature of the hot zone will drop to about 1000° C. and when the transfer is complete the temperature is raised to the fabrication temperature of Table III over the period of time indicated in Table III.

After holding the sample at fabrication temperature for the amount of time shown in Table III, a pressure of 4000 p.s.i. is applied to the pistons for a period of time as shown, and the dense interdispersion thus formed is then ejected from the hot zone, cooled and removed from the press.

Samples are cut from the dense interdispersion for determining transverse rupture strength and hardness. In the examples where indicated in Table III, additional samples are cut from the dense interdispersion for cutting tool tests. The latter are prepared as rectangles ½ inch by ½ inch by 3/16 inch in size with the corners ground to a radius of about 1/32 of an inch.

The cutting tool tests are performed by clamping the rectangular sample in a conventional turning tool holder which is in turn mounted on a lathe. The metal subject is a cylinder of AISI 4340 steel about 4 inches in diameter, having a Brinnell hardness of approximately 350. The tests are run at a speed of 850 surface feet per minute, a depth of cut of .05 inch and a feed of .098 inch. Cutting is carried out for 3 minutes after which the rectangular sample is examined by optical microscope to determine flank wear and crater depth. None of the tools developed thermal cracking lines.

TABLE III

| | Composition | | | | | | | | |
|---|---|---|---|---|---|---|---|---|---|
| | Vol. percent | | Metal vol. percent | | Refractory components (vol. percent) | | | | |
| Ex. No. | Amt. Metal | Amt. Refractory | W | Other | TiN | TaN | ZrN | AlN | Al$_2$O$_3$ | Others |
| 36 | 30 | 70 | 8 | 22 Cr | 50 | | | | 20 | |
| 37 | 30 | 70 | 30 | | 40 | 30 | | | | |
| 38 | 30 | 70 | 30 | | 50 | | | | | 20* REN |
| 39 | 20 | 80 | 20 | | 60 | 20 | | | | |
| 40 | 20 | 80 | 34 | 16.6 Cr | 80 | | | | | |
| 41 | 30 | 70 | 30 | | 50 | | | | | 20 ZrSiO$_4$ |
| 42 | 30 | 70 | 30 | | | | | | 5 | 15 50 VN |
| 43 | 30 | 70 | 15 | 15 Cr | 50 | | | | 20 | |
| 44 | 20 | 80 | 6 | 14 Cr | 80 | | | | | |
| 45 | 30 | 70 | 30 | | 50 | | | | | 20* REN |
| 46 | 30 | 70 | 30 | | 50 | | | | | 20 MgO |
| 47 | 30 | 70 | 30 | | 50 | | | | 5 | 15 Y$_2$O$_3$ |
| 48 | 30 | 70 | 30 | | 50 | | | | | 20 ZnO |
| 49 | 20 | 80 | 3 | 17 Cr | | | | 80 | | |
| 50 | 20 | 80 | 3.5 | 16.5 Cr | 60 | | | | 20 | |
| 51 | 30 | 70 | 30 | | 50 | | | | 5 | 15 TiO$_2$ |
| 52 | 30 | 70 | 30 | | 50 | | | | 5 | 15 ZrO$_2$ |
| 53 | 30 | 70 | 30 | | | | 50 | | 5 | 15 |
| 54 | 25 | 75 | 25 | | 35 | | | | 5 | 35 |
| 55 | 10 | 90 | 10 | | 50 | | | | 5 | 35 |
| 56 | 30 | 70 | 30 | | 60 | | | | 5 | 5 |
| 57 | 10 | 90 | 10 | | 80 | | | | 5 | 5 |
| 58 | 30 | 70 | 30 | | 50 | | | | 5 | 15 |
| 59 | 30 | 70 | 30 | | 40 | | | | 30 | |
| 60 | 30 | 70 | 26 | 4 Mn | 50 | | | | 5 | 15 |
| 61 | 30 | 70 | 26 | 4 Ni | 50 | | | | 5 | 15 |
| 62 | 30 | 70 | 26 | 4 Co | 50 | | | | 5 | 15 |
| 63 | 30 | 70 | 26 | 4 Fe | 50 | | | | 5 | 15 |

| | Fabrication conditions | | | | Properties | | Cutting tool test (mils) | |
|---|---|---|---|---|---|---|---|---|
| Ex. No. | Max. temp., °C. | Heat-up time, min. | Hold time before press., min. | Hold time under press., min. | Transverse rupt. str., p.s.i. | Hardness Rockwell A | Avg. flank wear | Avg. crater depth |
| 36 | 1,500 | 13.5 | 4 | 2 | 130,000 | 90.4 | 6 | 2.5 |
| 37 | 1,600 | 17.5 | 3 | 3 | 143,000 | 89.2 | | |
| 38 | 1,650 | 17.5 | 3 | 3 | 97,000 | 86 | | |
| 39 | 1,600 | 16.5 | 3 | 3 | 137,000 | 90.2 | 6 | 0.5 |
| 40 | 1,500 | 11.5 | 3 | 3 | 120,000 | | | |
| 41 | 1,600 | 16 | 3 | 3 | 123,000 | 90.9 | 8 | 0.5 |
| 42 | 1,600 | 16 | 3 | 3 | 110,000 | 90.4 | 8 | 0.5 |
| 43 | 1,400 | 9 | 3 | 3 | 106,000 | 91.9 | 6 | 1.0 |
| 44 | 1,500 | 6.5 | 3 | 3 | 115,000 | 92.8 | | |
| 45 | 1,600 | 17 | 3 | 3 | 77,000 | 87.8 | 10 | 1.0 |
| 46 | 1,600 | 15 | 3 | 3 | 96,000 | 89 | 8 | 0.5 |
| 47 | 1,700 | 9.5 | 3 | 3 | 124,000 | | 12 | 0.5 |
| 48 | 1,600 | 14 | 3 | 3 | 107,000 | 86.7 | 8 | 0.5 |
| 49 | 1,550 | 10.5 | 3 | 3 | 129,000 | | 8 | 0.5 |
| 50 | 1,500 | 11 | 3 | 3 | 84,000 | 91.6 | | |
| 51 | 1,750 | 11 | 3 | 3 | 110,000 | 87.3 | 12 | 1.0 |
| 52 | 1,700 | 10 | 3 | 3 | 142,000 | 89.4 | 6 | 1.0 |
| 53 | 1,700 | 9.5 | 3 | 3 | 128,000 | 19.1 | 8 | 1.0 |
| 54 | 1,800 | 15 | 3 | 3 | 105,000 | 91.6 | | |
| 55 | 1,800 | 15 | 3 | 3 | 127,000 | 92.8 | | |
| 56 | 1,800 | 15 | 3 | 3 | 175,000 | 90.5 | | |
| 57 | 1,800 | 15 | 3 | 3 | 115,000 | 90 | | |
| 58 | 1,600 | 19 | 2 | 4 | 232,000 | 90.5 | | |
| 59 | 1,800 | 8 | 3 | 3 | 193,000 | 90.8 | | |
| 60 | 1,600 | 19 | 2 | 4 | 206,000 | 90.5 | | |
| 61 | 1,600 | 19 | 2 | 4 | 178,000 | 89.8 | | |
| 62 | 1,600 | 19 | 2 | 4 | 123,000 | 91.6 | | |
| 63 | 1,600 | 19 | 2 | 4 | 162,000 | 90.5 | | |

*Mixed rare earth nitrides.

EXAMPLE 64

Two hundred and one parts of finely divided titanium nitride having a surface area of 3.3 m.$^2$/g. and prepared by the thermal decomposition of the reaction product of titanium tetrachloride with ammonina, are loaded into a 4.8 liter iron mill containing 14,000 parts of tungsten carbide-6% cobalt rod inserts, with 72.5 parts of aluminum nitride produced by nitriding flake aluminum metal and which has 4.5 m.$^2$/g. surface area, 256 parts of tungsten metal having a surface area of 2 m.$^2$/g., obtained from commercial sources, and 13.2 parts of nickel metal having a surface area of 0.55 m.$^2$/g. and also obtained from commercial sources, along with 612 parts of a high boiling, hydrocarbon oil having a flash point of 130° F. The above materials are milled for 5 days at a roller speed of 60 r.p.m., during which time they pick up 1.3 percent tungsten carbide-cobalt from attrition of the inserts and 1.0 percent iron from attrition of the mill. This slurry is then put into a resin kettle and allowed to settle and the supernatant is removed. The slurry is then dried under vacuum, using heat from infrared lamps, and the resulting powder is screened through a 70 mesh screen under nitrogen and stored in a plastic bottle under nitrogen. The surface area of the dried powder is 13 m.$^2$/g. Twenty-eight parts of this powder is loaded under an inert gas protective atmosphere into a graphite mold which has a 1 inch inner diameter, and the mold is tapped and rotated to achieve uniform packing of the powder. A top piston is then inserted and the mold is placed into a vacuum hot press furnace at a temperature of 1175° C. and heated to 1800° C. in 8 to 9 minutes. The mold is held at this temperature for 2 minutes, and then a pressure of 4000 p.s.i. is applied and held on the sample for a period of 4 minutes, after which the sample is quickly removed from the hot zone of the furnace.

The pressed sample is cut up with a diamond saw to yield transverse rupture specimens approximately 70 mils square, and are tested with an "Instron" tensile testing machine on a ½" span. The transverse rupture strength of these materials is 279,000 and 248,000 p.s.i., respectively, on two separate pressings, and the hardness measured on the Rockwell A scale is 91.

Several more pressings of a similar nature are prepared and from these are fabricated cutting tool inserts of various sizes for use in a variety of cutting operations.

One of the tools is fabricated into a tip for a boring tool and is used in boring holes in an extremely hard and strong high alloy maraging steel. This steel has a nickel content of 18%, a tensile strength of 250,000 p.s.i., and Rockwell C hardness of 48 and is being fabricated as a diaphragm for a flexible drive shaft in a helicopter power train.

Under cutting conditions of 185 surface feet per minute, a feed of .003 inch per revolution, employing a depth of cut of 1/16 inch and a length of cut of 3/16 inch, this tool has a tool life, measured in terms of the number of parts produced before regrinding is necessary, which is ten times that of a C–7 grade of carbide. In addition to having a tool life ten times greater than the available commercial carbide, productivity is up 20% due to the higher speed of operation capable with this tool. The exceptional performance of this tool relative to the carbide is attributed to the resistance to heat checking and thermal fatigue failure of the tool, whereas commercial tools fail in this fashion. This tool also exhibits exceptional crater resistance.

In a similar test on the same steel and operating in a turning operation at a speed of 187 s.f.m., with a .033 inch feed, a ⅛ inch depth of cut and a length of cut of ¼ inch, it is found again that the life of the tool wherein regrinds is ten times that of a C–7 carbide, with a 20% increase in productivity.

One of these tools is used as a grooving tool on the same type of steel. This time it is compared with a C-2 carbide, which is employed on this job as the best commercially available tool because of the higher strength requirements for this kind of operation. It is found that 350 pieces are prepared before regrinding is necessary, using the tool of this example, compared to 70 pieces with the C–2 carbide tool. In addition, a 10% increase in productivity is obtained as a result of the higher speed at which it is possible to operate this tool.

Still another one of these tools is tested on a 4340 grade steel having a Rockwell C hardness of 28 to 32 as an end mill running at a speed of 510 s.f.m. and a feed of .0012 inch per tooth. This end mill is operated on a semicircular cut having a 1 15/16 inch diameter and a length of cut of 2⅛ inch. Using as a criterion the number of parts which are produced before the tool requires regrinding, this end mill has five times the tool life of C–6 grade carbide which is customarily employed for this work.

In still another operation, this time on a work piece of 4340 steel having a Rockwell hardness of 40 on the C scale and a tensile strength of 200,000 p.s.i., with the tool operating as a profile cutter at a surface feed of between 100 and 200 s.f.m., with a maximum depth of cut of .00001 inch and a feed of .010 inch, the tool is found to have sixteen times the life of commercial C–6 carbide operating under similar conditions, with the exception that the C–6 carbide can only be run at half the speed of the tool of this example. The tool of this example has two times the productivity and 16 times the tool life at this higher productivity than the carbide tool customarily used for this purpose.

I claim:

1. A tool for cutting metal comprising a dense interdispersion of from 1.5 to 19 parts by volume of an essential nitride selected from the group consisting of the nitrides of aluminum, titanium, zirconium, tantalum, hafnium, niobium, vanadium and their mixtures, bonded with one part by volume of a metal selected from the group consisting of molybdenum, tungsten, rhenium and their alloys, said dense interdispersion being characterized in that the thermal coefficient of expansion of the metal binder differs by a factor of less than 2 from the thermal coefficients of expansion of the nitrides present.

2. A tool of claim 1 in which up to 50% by volume of the essential nitride in the dense interdispersion is replaced by a compound selected from the group consisting of the nitrides of beryllium, thorium, cerium, boron, uranium, and the rare earth metals; the silicates, aluminates and chromites of zirconium, magnesium, calcium, barium and strontium; the carbides of titanium, niobium, zirconium, and tantalum; the oxides of magnesium, zirconium, aluminum, thorium, hafnium, titanium, chromium, beryllium, zinc, calcium, barium, strontium, silicon, cerium, and the rare earth metals; and mixtures of these; said dense interdispersion being characterized in that the thermal coefficient of expansion of the metal binder differs by a factor of less than 2 from the thermal coefficients of expansion of the nitrides and their replacements present.

3. A tool of claim 1 in which up to 80% by volume of the essential nitride in the dense interdispersion is replaced by a compound selected from the group consisting of alumina and titanium carbide, said dense interdispersion being characterized in that the thermal coefficient of expansion of the metal binder differs by a factor of less than 2 from the thermal coefficients of expansion of the nitrides and their replacements present.

4. A tool of claim 1 in which the dense interdispersion contains continuous three-dimensional networks of both the binder metal and the essential nitride, and the average grain size of the components is less than 10 microns.

5. A tool of claim 2 in which the dense interdispersion contains continuous three-dimensional networks of both the binder metal and the essential nitride, and the average grain size of the components is less than 10 microns.

6. A tool of claim 3 in which the dense interdispersion contains continuous three-dimensional networks of both the binder and the essential nitride, and the average grain size of the components is less than 10 microns.

7. A tool of claim 1 in which the essential nitride is a mixture of titanium nitride and aluminum nitride and the binder metal is selected from the group consisting of tungsten and its alloys.

8. A tool of claim 3 in which the essential nitride is selected from the group consisting of titanium nitride, aluminum nitride and their mixtures, the metal is selected from the group consisting of tungsten and its alloys, and the replacement compound is alumina.

(References on following page)

References Cited

UNITED STATES PATENTS

| | | | |
|---|---|---|---|
| 3,409,416 | 11/1968 | Yates | 75—205 X |
| 3,409,417 | 11/1968 | Yates | 29—182.5 |
| 3,409,418 | 11/1968 | Yates | 29—182.5 |
| 3,409,419 | 11/1968 | Yates | 75—205 X |

BENJAMIN R. PADGETT, Primary Examiner

A. J. STEINER, Assistant Examiner

U.S. Cl. X.R.

29—182.5, 182.8; 75—205